UNITED STATES PATENT OFFICE.

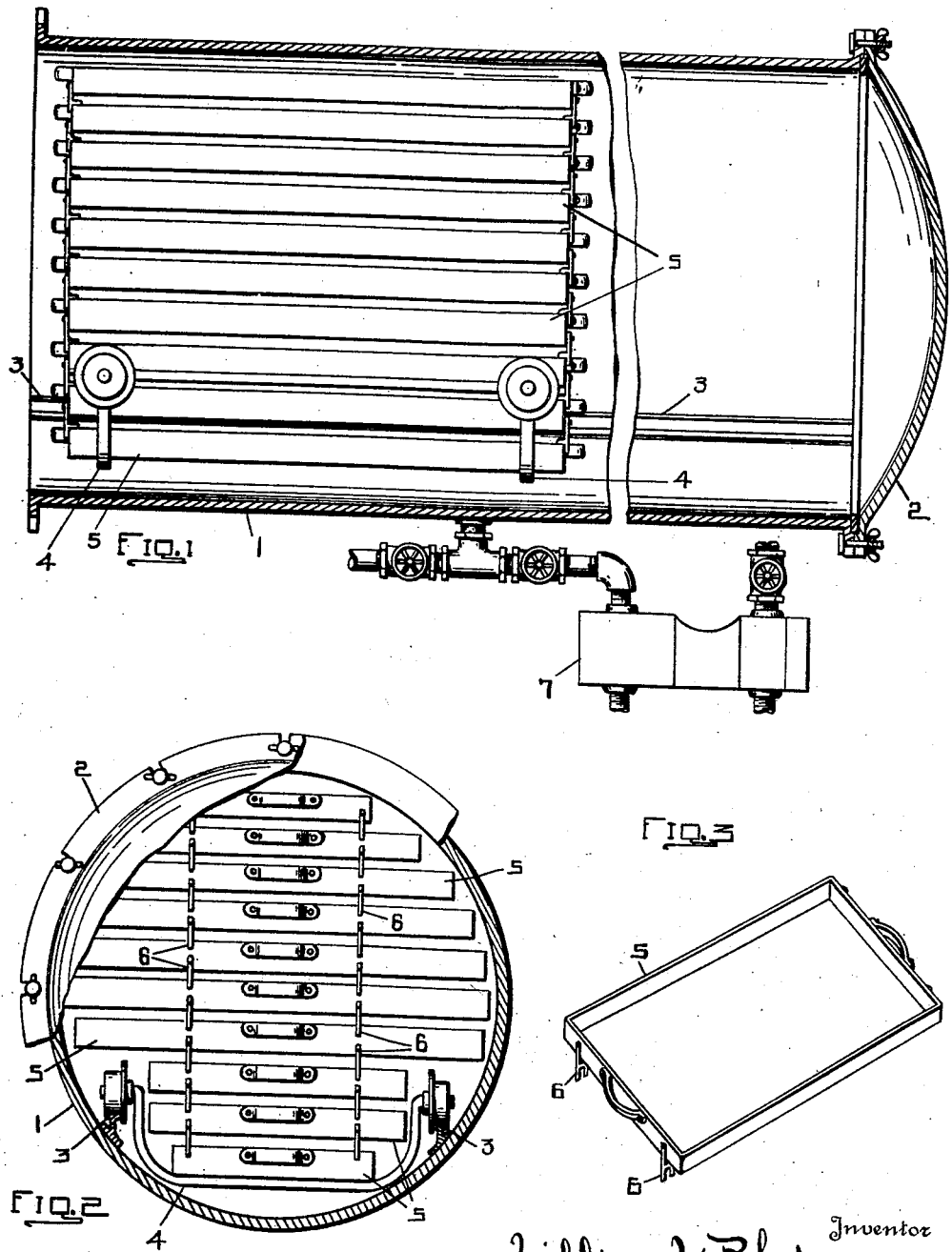

WILLIAM W. RHODES, OF WOODVILLE, OHIO.

METHOD OF PROMOTING PLASTICITY OF MORTAR MATERIALS.

1,318,922.      Specification of Letters Patent.      Patented Oct. 14, 1919.

Application filed September 27, 1916. Serial No. 122,367.

*To all whom it may concern:*

Be it known that I, WILLIAM W. RHODES, a citizen of the United States of America, residing at Woodville, Sandusky county, Ohio, have invented new and useful Methods of Promoting Plasticity of Mortar Materials, of which the following is a specification.

This invention relates to the densification of subdivided materials and the vacuum treatment thereof.

This invention has utility in connection with alkaline hydrates, especially of the alkaline earth group, as calcium or magnesium containing substances, producing a more dense dry material, and with added moisture increasing its plasticity, as well as improving its texture of smoothness in working up with water and using as a plaster or wall finish. In the instance of calcium hydrate and magnesium hydrate as herein manufactured, with water and associated desired substances, there may be produced a wall finish applicable to result in increased density face for the wall, less open and less liable to check. There is the further commercial advantage that this hydrate is of less bulk, and of increased specific gravity. This bulk reduction may be as much as 22% with a vacuum of 13 c. m. Hg. This bulk reduction has been tested out with several wall finish products from various quarries.

In the operation hereunder, the material to be treated is normally taken in the subdivided state and its enveloping atmosphere rarefied. This may occur when the material is being tempered or seasoned by water, with the material in a quiescent state in a receiver, which receiver may be air tight and have the pressure reduced therein. The material calcined, hydrated and ground, or uniformly sub-divided, may be acted upon hereunder before sacking or packaging, thus reducing the container volume for a given weight, substantiating the theory that by this treatment a removal of a larger or smaller portion of air from the mass allows the particles to settle more closely together. This material is accordingly effectively improved in its condition by the treatment, independent of manipulation or pressure compacting thereof. This treatment may occur for the extraction of air or the inactive fluid from the hydrate or other sub-divided material associated or isolated. The association may be in a mixture especially combined for commercial purposes.

In any event, if there be not the actual extraction of air, there is such re-arrangement of particles that they will, for a given weight, occupy a less volume, and, in the application of water for the purpose of making a mortar or putty, less moisture is required and this less moisture acts more readily so that there is ease in working the material up. There is the still further advantage that the worked-up material seems to have a greater smoothness thus it is more readily applicable in a mass, joint or finish formation, in taking a set of greater strength and less porosity.

The duration of treatment and the severity thereof may be adjusted to meet the conditions as may be found most advantageous in the variations normally confronting the operator.

Accordingly in carrying out the process hereunder the divided hydrate, say of lime, is a normally finished dry commercial product as submitted to the reduced air pressure envelop, of a vacuum or partial vacuum seemingly effective in removing inactive associated air from the mass which apparently tended to isolate the particles thereby resulting, without the application of pressure, in an automatic compacting of the mass to give it reduced volume in this loose powdered state. This is a direct extraction of air from a previously dry mass and leaves particles free to settle against each other, advantageous in that the same weight may be handled in less size containers. Furthermore, this leaves the particles more susceptible for water taking up in the use of material as in mortar. Less water is necessary in the mortar mixing. The resulting paste is more smooth and the finished wall is of improved density and firmness.

In the carrying out of the invention an apparatus may be used as disclosed in the accompanying drawings.

Figure 1 is a fragmentary showing in side elevation of a charging cylinder or retort with a tray loaded car therein;

Fig. 2 is an end elevation of the cylinder and car of Fig. 1, parts being broken away; and Fig. 3 is a perspective view of one of the material carrying trays to be loaded on the car.

The charging cylinder 1 may have its ends closed by the packed and removable heads 2 in order that the tracks 3 may have rolled thereon the cars 4 carrying the trays 5 with a more or less thinly distributed layer of the material to be acted upon. The trays 5 in their stacking on the cars 4, have the interfitting legs 6, spacing the trays so there may be free air circulation over the material in the trays. The cylinder 1 may be charged with cars of material carrying trays, the loose material on the trays being say lime hydrate for compacting. The heads 2 are clamped in position, and the vacuum pump 7 operated to reduce the pressure in the cylinder 1.

The various factors of character of material, duration of treatment and extent of vacuum, each enter into consideration in determining procedure hereunder. With dry hydrate of lime spread out in approximately six-inch layers and subjected to a pressure reduced to one-half atmosphere for a period of one hour, there is such compacting and improving in the nature thereof as herein disclosed.

What is claimed and it is desired to secure by United States Letters Patent is:

The method of reducing the dry bulk of alkali hydrate, reducing the water volume take-up of such treated hydrate when such hydrate is mixed with water to produce a given consistency at preparation for mortar and plaster uses, and imparting to such treated hydrate when such hydrate is worked into mortar or plaster an increased plasticity, said treatment comprising the removal of air from the dry hydrate while said hydrate is in a pulverulent state, and settling down the subdivided particles having the air removed therefrom to produce a compacted mass of reduced volume.

In witness whereof I affix my signature.

WILLIAM W. RHODES.

Copies of this patent may be obtained for five cents each, by addressing the "Commissioner of Patents, Washington, D. C."